US005528718A

United States Patent [19]
Ray et al.

[11] Patent Number: 5,528,718
[45] Date of Patent: Jun. 18, 1996

[54] FIBER OPTIC CABLE SYSTEM INCLUDING MAIN AND DROP CABLES AND ASSOCIATED FABRICATION METHOD

[75] Inventors: Craig D. Ray; Carney P. Claunch, II, both of Cary; Terrance D. Hunsinger; Julian S. Mullaney, both of Raleigh; Michael L. Randolph, Fuguay-Varina; Robert G. Sember, Raleigh; James R. Shaw, Garner; Amanda C. Smith; Stephen E. Wald, both of Raleigh, all of N.C.

[73] Assignee: Raychem Corporation, Menlo Park, Calif.

[21] Appl. No.: 394,118

[22] Filed: Feb. 24, 1995

Related U.S. Application Data

[62] Division of Ser. No. 48,610, Apr. 16, 1993, Pat. No. 5,440,665.

[51] Int. Cl.⁶ .................................................... G02B 6/36
[52] U.S. Cl. .......................... 385/136; 385/99; 385/135
[58] Field of Search ................................. 385/135–137, 385/99–100, 101, 106, 107; 439/99, 623; 174/91, 92, 93

[56] References Cited

U.S. PATENT DOCUMENTS

| 4,310,209 | 1/1982 | Fleming et al. | 439/99 |
| 4,359,262 | 11/1982 | Dolan | 385/135 |
| 4,947,925 | 12/1990 | Troutman et al. | 385/99 |
| 4,986,761 | 1/1991 | Gladden, Jr. et al. | 439/99 |
| 5,121,458 | 6/1992 | Nilsson et al. | 385/135 X |
| 5,185,844 | 2/1993 | Bensel, III et al. | 385/99 |
| 5,210,812 | 5/1993 | Nilsson et al. | 385/100 |
| 5,241,611 | 8/1993 | Gould | 385/99 |
| 5,367,594 | 11/1994 | Essert et al. | 385/99 |

*Primary Examiner*—Rodney B. Bovernick
*Assistant Examiner*—Hemang Sanghavi
*Attorney, Agent, or Firm*—William D. Zahrt, II; Herbert G. Burkard

[57] ABSTRACT

A fiber optic cable system, such as a preterminated fiber cable, includes a main cable and one or more drop cables connected to the main cable at spaced apart locations along the main cable. The drop cable is spliced to the main cable using a splice closure including a fiber guide that secures spliced together end portions of the respective fibers in a longitudinally extending direction and devoid of any slack coils of optical fibers. Accordingly, the overall diameter of the splice closure is relatively small thereby permitting the cable system to be stored on a reel and to be readily placed within small diameter conduits. The splice closure includes a heat recoverable housing surrounding the fiber guide. Cable sheath end portions are sealed by melting C-shaped bodies of heat flowable material positioned adjacent cable sheath end portions.

11 Claims, 8 Drawing Sheets

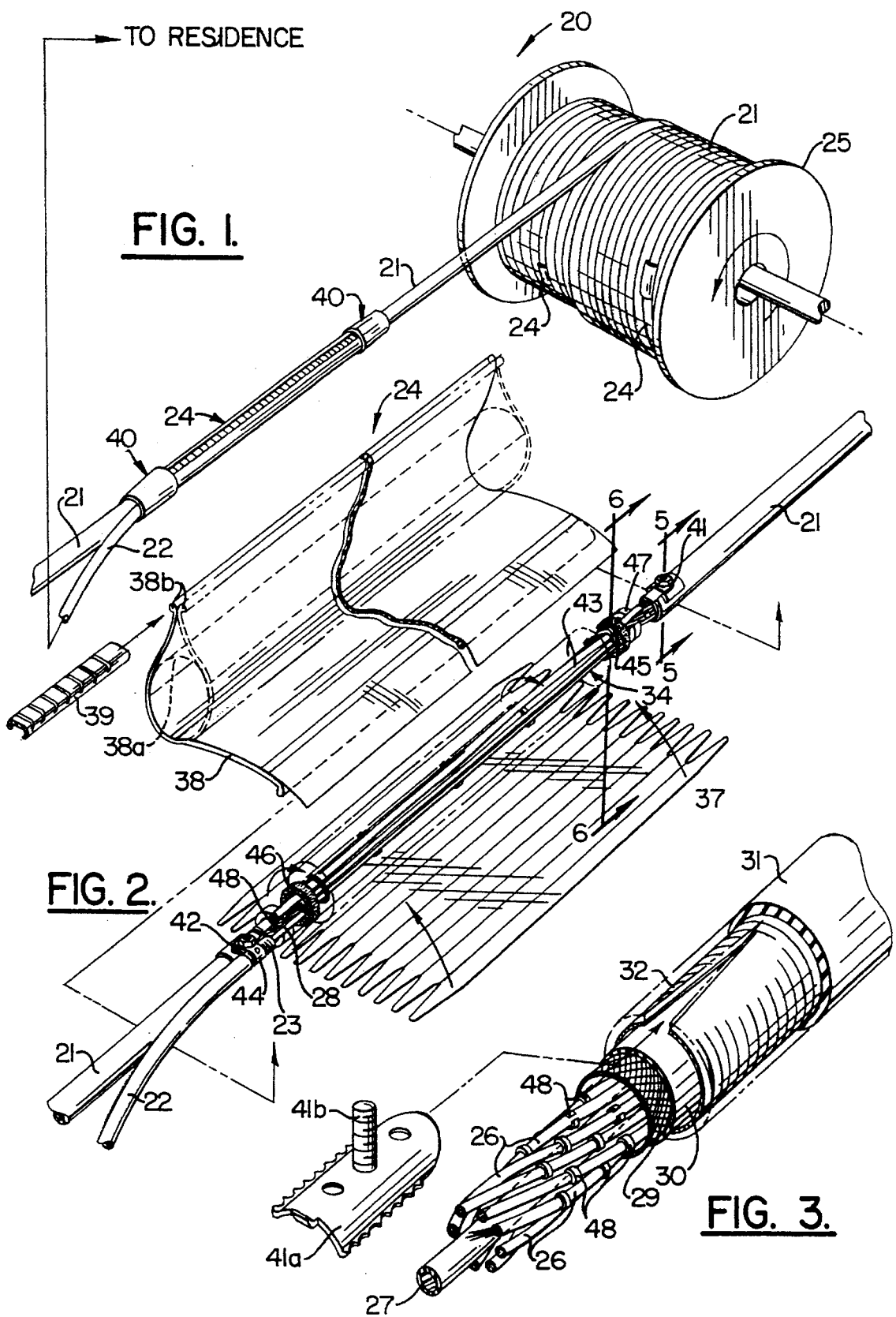

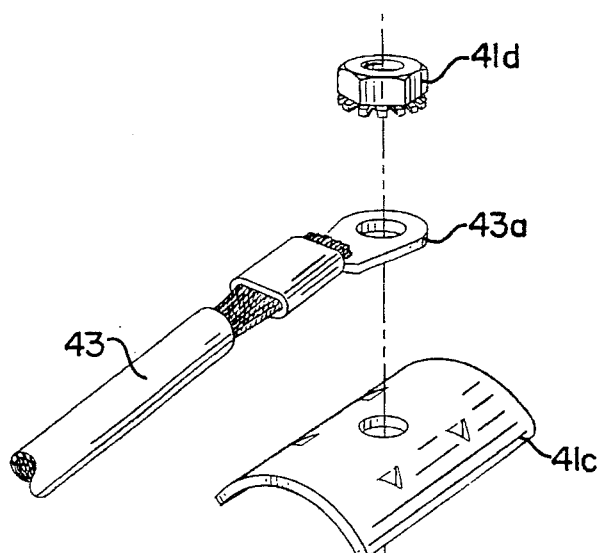
FIG. 4.
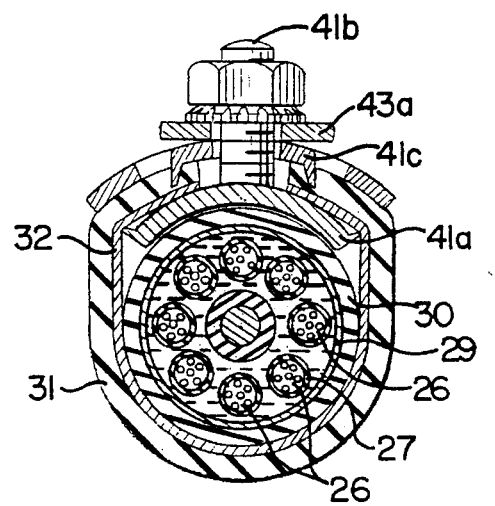
FIG. 5.
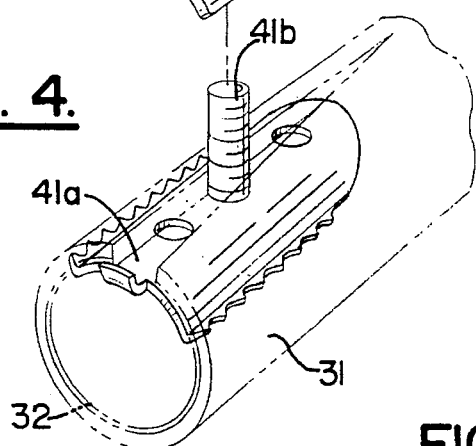
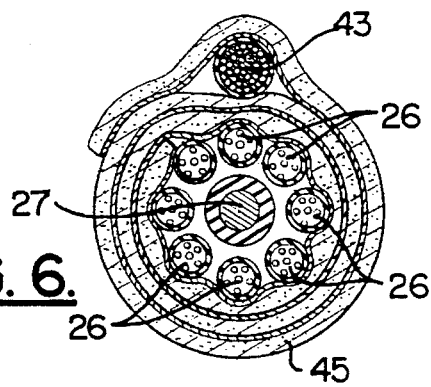
FIG. 6.
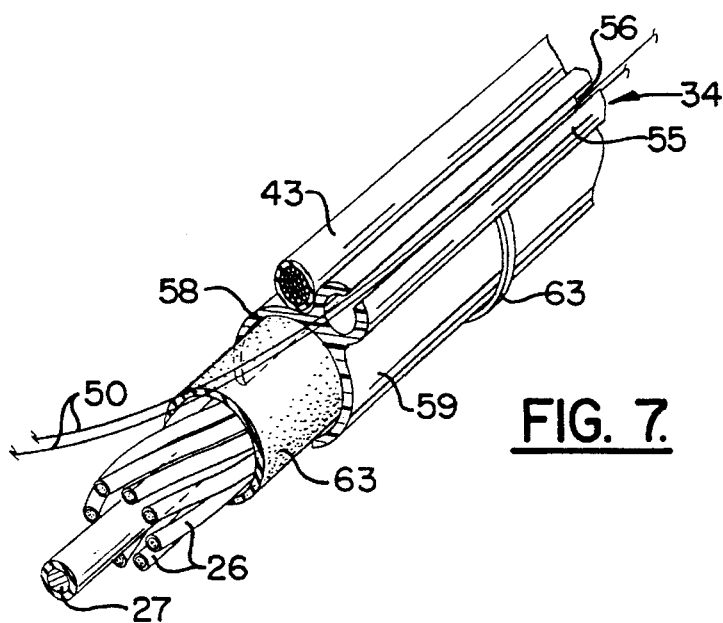
FIG. 7.

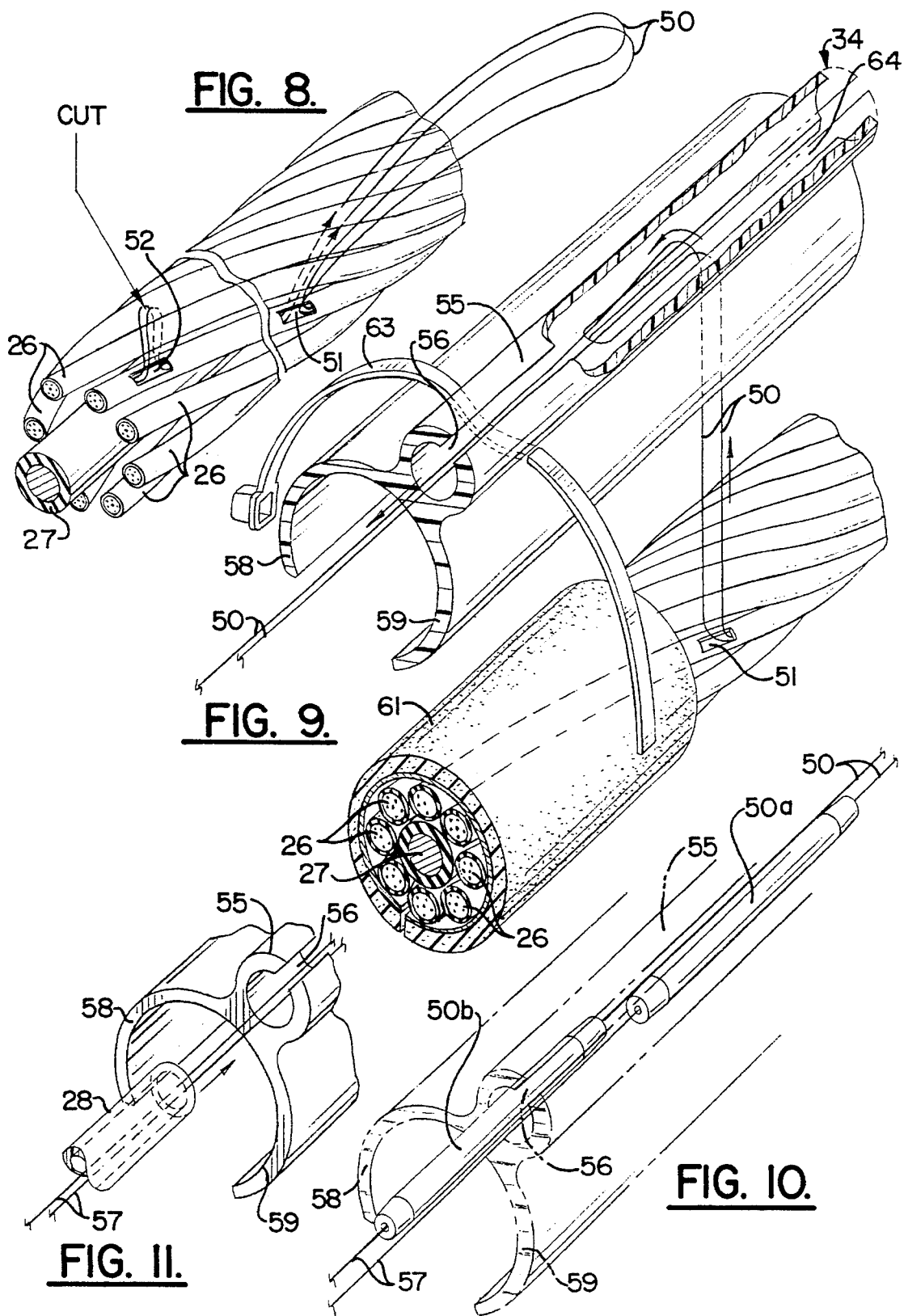

FIBER OPTIC CABLE SYSTEM INCLUDING MAIN AND DROP CABLES AND ASSOCIATED FABRICATION METHOD

This application is a division of application No. 08/048,610 filed Apr. 16, 1993, now U.S. Pat. No. 5,460,665, the disclosure of which is incorporated by reference.

FIELD OF THE INVENTION

The invention relates to the field of fiber optic communications systems, and more particularly, to a fiber optic cable system and associated methods.

BACKGROUND OF THE INVENTION

Fiber optic cables are widely used for telecommunications applications where high information capacity, noise immunity and other advantages of optical fibers may be exploited. Fiber cable architectures are emerging for connecting homes and/or business establishments, via optical fibers, to a central location, for example. One such architecture includes a trunk or main cable routed through a housing subdivision, for example, while small fiber count "drop cables" are spliced to the main cable at predetermined spaced apart locations.

A typical main cable may be installed underground and have multiple drop cables connected thereto, each of a hundred feet or more. Each of the drop cables, in turn, is routed to an optical network unit (ONU) serving several homes. Accordingly, information may be transmitted optically to the ONU, and into the home via conventional copper cable technology. Thus, the drop cables may serve groups of users, although other architectures may also employ a main cable and one or more drop cables connected thereto.

Unfortunately, the fibers within the main cable must typically be accessed at the various drop points and spliced to respective drop cables after the main cable has already been installed. Accessing the main cable for splicing requires careful preparation of the main cable including removing a portion of the cable sheath, and identifying and separating out predetermined fibers from within the cable without disturbing adjacent fibers. The separated fibers may then be spliced and secured within a conventional protective splice closure. Moreover, these cable access and splicing steps must typically be accomplished in the field by a technician who is likely to experience difficulties imposed by weather or the particular location of each of the drop points. Accordingly, field splicing of drop cables to a main cable is time consuming, expensive, and may produce low quality optical splices.

In an effort to overcome the disadvantages of field splicing drop cables at each of a series of drop points, so-called preterminated fiber optic cables have been proposed. A preterminated fiber optic cable includes a relatively high fiber count main cable to which respective low fiber count drop cables are spliced at predetermined drop points. The locations of the drop points are determined based upon field survey measurements.

The splicing of the drop cables to the main cable of a preterminated cable is performed at the factory during manufacturing of the cable. The preterminated cable, including the main cable, drop cables, and associated splice closures, are desirably wound onto a cable reel and delivered to the installation site. Accordingly, conditions for making high quality splices may be maximized in the factory, thereby increasing splice quality and also reducing the expense and difficulty associated with field splicing.

Exemplary of a preterminated cable is U.S. Pat. No. 5,121,458 to Nilsson et al. entitled *Preterminated Fiber Optic Cable*. The patent discloses a splice closure for splicing each of the drop cables to the main cable. The splice closure is generally cylindrical being no greater than 4 inches in diameter and 7 inches in length to facilitate winding of the preterminated cable, including the associated splice closures, onto a cable reel for shipping and installation. In particular, the patent discloses that the diameter of the splice closure is slightly less than 4 inches in diameter so that the preterminated cable may be installed through a 4 inch conduit.

The splice closure as disclosed in U.S. Pat. No. 5,121,458 uses a conventional technique for storing slack fibers within the splice closure, that is, the slack is stored in slack coils or loops. The slack coils must be made without violating the minimum bend radius of the fibers. Accordingly, the splice closure still must have a relatively large outer diameter which hampers winding of the splice closures onto the cable reel, and which may also greatly complicate installation of the cable within a section of buried conduit. For example, conduits less than 4 inches are commonly used for placing a conventional fiber optic or copper cable to facilitate installation under obstructions, such as a driveway. In addition, small diameter conduits are also desirably used to reduce excavation time and expense when installing the conduit.

U.S. Pat. No. 5,125,060 to Edmundson entitled *Fiber Optic Cable Having Spliceless Fiber Branch and Method of Making Same* discloses another approach in an attempt to overcome the difficulties in reducing the size of the connection or branching point of the drop cables from the main cable. The patent discloses spliceless stub cables extending from the main cable. More particularly, an opening is made in the jacket of the main cable at a disconnect point downstream from the intended branching point. The fibers to be branched for the stub cable are severed and pulled back through the branching point. The branched fibers are routed through a stub cable sheath and the disconnect point of the cable is sealed. The penetration into the main cable sheath, as well as its joint with the stub cable sheath are sealed at the branching point by a plastic housing. Thus, no splices are required and no slack optical fibers need be stored within the protective housing at the branching point.

Unfortunately, the approach disclosed in U.S. Pat. No. 5,125,060 suffers from a significant drawback in that the stub cable extending from the main cable is limited to only about 12 feet in length. Accordingly, for a typical fiber optic cable system route, a conventional splice is still needed to add an additional length of cable to the stub cable, and the splice must still be made in the field by a technician. Another drawback of the approach disclosed in U.S. Pat. No. 5,125,060 is that considerable care must be taken when pulling the 12 foot lengths of fibers back through the branching point during preparation of the stub cables. A corresponding difficulty is encountered when stuffing the 12 foot lengths of fibers into the stub cable sheath. The main cable sheath is also penetrated 12 feet downstream from the branching point at the disconnect point, and this cable penetration must also be sealed to protect the cable from water entry.

Because the fiber optic cable systems described above include penetrations of the cable sheath, it is important to seal such penetrations to prevent water from entering the cable and damaging the optical fibers particularly at a splice location. One approach to sealing a splice point is disclosed in U.S. Pat. No. 5,125,060 which describes a heat recoverable housing surrounding the branch point from which the short stub cables extend. Similarly, U.S. Pat. No. 5,121,458 discloses a heat recoverable housing surrounding the splice closure which, in turn, stores the coils of slack cable in a conventional fashion.

U.S. Pat. No. 5,185,844 to Bensel, III et al. entitled *Closure for Optical Fiber Connective Arrangements and Method for Making Same* discloses a splice closure for joining together only two small fiber count cables in an in-line configuration with very little slack in the optical fibers. Thus, the closure is not suitable for splicing a drop cable to a main cable as in a preterminated fiber optic cable.

SUMMARY OF THE INVENTION

In view of the foregoing background, it is therefore an object of the present invention to provide a fiber optic cable system and associated fabrication method including a relatively compact splice closure for joining one or more drop cables to a main cable so that the entire cable system may be readily wound upon a cable reel and readily installed within a typical conduit system.

It is another object of the present invention to provide a fiber optic cable system which is effectively sealed where the cables enter the interior of the splice closure to protect the splices from water damage, such as caused by water migration from the cable end.

These and other objects, advantages, and features of the present invention are provided by a fiber optic cable system including a main cable and a drop cable joined together at a splice closure, wherein at least one spliced together fiber portion is guided in a generally longitudinal path adjacent the main cable, and wherein the spliced together fiber portion is devoid of a slack coil of optical fibers. Accordingly, the outer diameter of the splice closure may be made very small so as to be readily accommodated within typical conduits and to be readily wound onto a conventional cable reel. For example, the splice closure according to the present invention may be fabricated having an outer diameter of less than about 1.8 inches.

The fiber optic cable system as described herein includes a preterminated cable system as may preferably be manufactured in a factory setting. As would be readily understood by those skilled in the art, the fiber optic cable system according to the present invention may also include a system wherein the drop cable and associated splice are made to the main cable in the field.

More particularly, the fiber optic main cable includes a longitudinally extending buffer tube having an opening at a first location, and at least one optical fiber having an end portion extending through the opening. As would be readily understood by those skilled in the art, the main cable may be of the type having a plurality of stranded buffer tubes or a single centrally located buffer tube. The main cable is typically a high fiber count cable of greater than about 48 fibers.

The fiber optic drop cable has an end secured to the main cable at a second location downstream from the first location. The drop cable includes at least one fiber and is typically a low fiber count cable having two or four fibers. An end portion of at least one optical fiber extends outwardly from the end of the drop cable. The at least one fiber end portion of the drop cable is spliced together with the at least one end portion of the fiber of the main cable by a conventional splicing technique, such as fusion splicing, and thereby define at least one spliced together fiber portion. Accordingly, the splice closure surrounds and protects the at least one spliced together fiber portion. Since it is typical that the drop cable and main cable would include two or more fibers spliced together, the plural term "fibers" is sometimes used herein, it being understood that a splice between even single fibers is contemplated by the invention.

The fiber guide means preferably includes an elongate tube having a longitudinally extending slot therein which receives the spliced together fiber portions. In addition, the drop cable preferably includes a central buffer tube having an end portion of its buffer tube positioned within an adjacent end portion of the elongate tube of the fiber guide means. The fiber guide means also preferably includes a pair of longitudinally extending arcuately shaped walls connected to the elongate tube and gripping adjacent portions of the main cable. The elongate tube and arcuately shaped walls may be integrally molded plastic, for example.

A foam cushion layer is preferably provided underlying the arcuately shaped walls of fiber guide means to serve as a cushioning layer. A plurality of longitudinally spaced apart fasteners, such as tie wraps, may surround the main cable and the pair of arcuately shaped walls to secure the fiber guide means to the main cable.

As would be readily be understood by those skilled in the art, the fiber optic main cable may preferably include a metallic shield surrounding the one or more buffer tubes. Accordingly, to permit access to a predetermined buffer tube for removing the end portions of the optical fibers, a longitudinally extending portion of the metallic shield is preferably removed from the main cable. The discontinuous metallic shield defines first and second cable shield end portions adjacent respective ones of the first and second locations along the main cable. Accordingly, the splice closure of the present invention preferably includes electrical connection means extending between the first and second metallic shield end portions and connected thereto for maintaining electrical continuity of the metallic shield.

The electrical connection means preferably includes a length of wire, and first and second bonding clamps securing opposing ends of the wire to respective first and second metallic shield end portions. The electrical connection means may thus be provided without adversely impacting the overall outer diameter of the splice closure. Yet another feature of the invention is that the second bonding clamp preferably includes a strap encompassing the end of the drop cable for securing the drop cable to the main cable. In an embodiment of the invention including a single buffer tube, such as in an LXE® cable by AT&T, longitudinal strength members may be cut and tucked under an adjacent portion of the shield. Alternately, a bonding clamp may be used of the type described in copending application entitled *FIBER OPTIC BONDING ASSEMBLY AND ASSOCIATED METHOD*, assigned to the assignee of the present invention, the entire of disclosure of which is incorporated herein by reference.

A longitudinally extending portion of the cable sheath is also preferably removed from the main cable and defines first and second cable sheath end portions adjacent respective ones of the first and second locations along the main cable. Moreover, the splice closure also preferably includes a heat recoverable housing surrounding the main cable and extending between the first and second cable sheath end portions to prevent water entry into the closure. The splice closure also preferably includes a heat shield layer underlying the heat recoverable housing for providing mechanical protection and for protecting the fiber guide means and other underlying components when heating the housing to cause the housing to shrink to its final dimensions.

Another aspect of the present invention is that the splice closure preferably includes sealing means contained within the heat recoverable housing adjacent respective first and second cable sheath end portions. The sealing means serves to prevent water migration into the splice closure from the cable sheath end portions. The sealing means also preferably includes first and second masses of heat flowable material surrounding the cable and filling any voids adjacent respective first and second cable sheath end portions.

To prevent flow of heat flowable material into the fiber guide when melting the heat flowable material, the sealing means also preferably includes respective blocking dams adjacent opposing ends of the fiber guide means. The blocking dams preferably include a layer of compressible material, such as a wound strip of foam material, surrounding the main cable. The blocking dams permit less heat flowable material to be used to protect the splices and help to reduce the need for a larger diameter splice closure.

To further facilitate sealing of the cable sheath end portions for a stranded buffer tube cable, concentric spacers surround respective predetermined ones of the buffer tubes for maintaining the buffer tubes in spaced apart relation. The spacers are preferably positioned on alternating tubes in a staggered relation. The thus spaced apart relation of the buffer tubes facilitates flow of the heat flowable material into voids between the buffer tubes.

According to another aspect of the invention, the sealing means and a heat recoverable tube define a sealing arrangement that may be used in other applications for sealing an end of a fiber optic cable, such as for a cable entry into a conventional splice closure. The protective sealing arrangement preferably includes a blocking dam surrounding one or more buffer tubes longitudinally spaced apart from the cable sheath end portion, a heat recoverable tube surrounding the fiber optic cable between the cable sheath end portion and the blocking dam, and at least one C-shaped body of heat flowable material which is melted and flows to fill voids underlying the heat recoverable tube.

A plurality of concentric spacers, as discussed above, preferably surround predetermined ones of the buffer tubes for a stranded cable design. The spacers position the buffer tubes in spaced apart relation to facilitate flow of said heat flowable material into voids between the spaced apart buffer tubes. The heat recoverable tube may also be a transparent material to permit viewing into the interior of the tube to assure proper flow of the heat flowable material upon heating. A bonding clamp may also be secured to a metallic shield portion of the cable for bonding or grounding of the cable shield.

Another aspect of the present invention is a combined strain relief and guide means preferably positioned on each end of the housing of a splice closure to provide both strain relief and to assist in guiding the enclosure through a conduit, for example. While the strain relief may preferably be used in combination with the splice closure for the main and drop fiber optic cables as described above, those of skill in the art will readily understand that the strain relief may be used in other splicing arrangements as well, such as in conventional copper cable splices.

More particularly, the cable has a first degree of flexibility, while a heat recoverable housing surrounding the cable splice will have a second degree of flexibility higher than the first degree of flexibility of the cable. The housing also includes an end opening through which a portion of the cable emerges. The strain relief is secured to the emerging portion of the cable immediately downstream from the end opening of the housing to provide strain relief to the emerging cable portion. The strain relief means includes an elongate body and means for securing the elongate body to the emerging cable portion. The elongate body preferably has a predetermined degree of flexibility, for producing in combination with the emerging cable portion, a third degree of flexibility between the first and second degrees of flexibility to thereby provide strain relief to the emerging cable portion.

The housing is preferably provided by a sheet of heat recoverable material having a pair of abutting longitudinally extending edge portions, and a clamp member for securing the edge portions together thereby defining an enlarged circumferential portion for the housing. Accordingly, the elongate body preferably further includes a longitudinally extending tapered portion aligned with the enlarged circumferential portion for facilitating passage of said splice closure through a conduit. In one embodiment of the invention, the elongate body preferably includes a second or tapered distal end portion for further facilitating passage of the splice closure through a conduit. The elongate body also preferably includes a proximal end portion extending longitudinally into the end opening of the heat recoverable housing and between the cable and the housing, thus, providing even greater strain relief capability.

In another embodiment of the invention, the clamp member has an end portion extending longitudinally outwardly a predetermined distance beyond adjacent edge portions of the sheet of heat recoverable material. Accordingly, a portion of the elongate body adjacent the tapered portion has a recess therein receiving therein the end portion of the clamp member. A tape wrapping or another fastener may be used to secure the elongate body to the cable.

A method for making the fiber optic cable system as described above includes the steps of withdrawing end portions of the optical fibers of the main cable outwardly from a buffer tube at a first location along the main cable. The end portions of optical fibers of the drop cable are spliced with respective end portions of the predetermined optical fibers of the main cable to form spliced together fiber portions. The spliced together fiber portions are secured adjacent the main cable in a generally longitudinally extending direction so that the spliced together fiber portions are devoid of a slack coil of optical fiber.

The method also preferably further includes the step of securing the end of the fiber optic drop cable to the main cable at a second location downstream from the first location. Accordingly, the step of securing the spliced together fiber portions preferably includes positioning a fiber guide extending in a generally longitudinal direction adjacent the main cable between the first and second locations thereof.

The fiber guide preferably is provided by an elongate tube having a longitudinally extending slot therein, and the step of securing the spliced together fiber portions includes positioning the spliced together fiber portions through the longitudinal slot of the elongate tube. The splicing step preferably includes preparing the respective fiber end portions so that the spliced together fiber portions have a substantially corresponding length to the elongate tube.

The drop cable also preferably includes a longitudinally extending buffer tube. Accordingly, the step of securing the drop cable to the main cable preferably includes inserting a portion of the drop cable buffer tube into an adjacent end of the elongate tube.

As discussed above, the cable is preferably of the type including a metallic shield and outer sheath that are removed substantially between the first and second locations along the main cable. Accordingly, the electrical continuity of the metallic shield is preferably maintained by connecting the shield end portions. The method also preferably includes the step of positioning a heat recoverable housing surrounding the main cable between the first and second cable sheath end portions.

As would be readily understood by those skilled in the art, the step of withdrawing end portions of the optical fibers of the main cable preferably includes severing same adjacent the second location along the main cable downstream from the first location along the main cable. For a typical splice, the separation between the first and second locations may be about a foot which provides sufficient fiber length to perform several splices if a remake is necessary.

Another method aspect according to the invention is for making the protective sealing arrangement for a fiber optic cable as described in greater detail above. The method may be used for sealing a cable end as in the splice closure for the main and drop cables, or the method may be used for a cable end entering a conventional splice closure. The method preferably includes the steps of positioning a blocking dam surrounding the one or more buffer tubes longitudinally spaced apart from a cable sheath end portion; positioning at least one body of heat flowable material surrounding the buffer tubes between the blocking dam and the cable sheath end portion; positioning a heat recoverable housing surrounding the fiber optic cable between the cable sheath end portion and the blocking dam; and heating the heat recoverable housing to shrink the housing and melting the heat flowable material to cause the heat flowable material to fill voids underlying the housing.

The body of heat flowable material is preferably C-shaped so that the step of positioning the body surrounding the fiber optic cable preferably includes inserting the fiber optic cable into an opening of the C-shaped body. The heat recoverable housing also serves to compress the C-shaped body upon melting to thereby force the material to flow to fill underlying voids.

BRIEF DESCRIPTION OF THE DRAWINGS

FIG. 1 is a perspective schematic view of a fiber optic cable system according to the present invention being payed out from a cable reel and illustrating a drop cable connected to a main cable at a splice closure.

FIG. 2 is an enlarged exploded perspective view of the splice closure according to the present invention.

FIG. 3 is a greatly enlarged exploded perspective view of a cable sheath end portion and metallic shield end portion as shown in FIG. 1 and illustrates positioning of a portion of a metallic shield bonding clamp member thereto.

FIG. 4 is a greatly enlarged exploded perspective view of a cable sheath end portion and metallic shield end portion as shown in FIG. 3 and illustrates installation of other metallic shield bonding clamp portions.

FIG. 5 is a greatly enlarged cross-sectional view taken along lines 5—5 of FIG. 2.

FIG. 6 is a greatly enlarged cross-sectional view taken along lines 6—6 of FIG. 2.

FIG. 7 is a greatly enlarged perspective fragmentary view of a portion of the fiber guide means and underlying main cable portion according to the invention with the heat shield and outer heat recoverable housing removed for clarity.

FIG. 8 is a greatly enlarged perspective view of spaced apart first and second locations along the main cable illustrating separation of optical fibers from a buffer tube according to the invention.

FIG. 9 is a greatly enlarged exploded perspective view of a portion of the fiber guide means adjacent the first location along the main cable according to the invention and illustrating routing of the separated optical fibers in the fiber guide means.

FIG. 10 is a greatly enlarged perspective view of a portion of the fiber guide means illustrating portions of the spliced together fiber portions according to the invention.

FIG. 11 is a greatly enlarged perspective view of an end portion of the splice guide at a second location along the main cable and illustrating connection to a buffer tube of the drop cable according to the invention.

DESCRIPTION OF THE PREFERRED EMBODIMENTS

Figure 12:
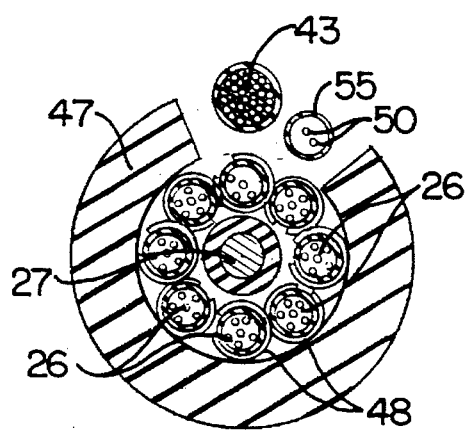
FIGS. 12–14 are a greatly enlarged cross-sectional views of a portion of the main cable illustrating sealing thereof and the sealing arrangement according to the present invention.

The present invention will now be described more fully hereinafter with reference to the accompanying drawings, in which a preferred embodiments of the invention are shown. This invention may, however, be embodied in many different forms and should not be construed as limited to the embodiments set forth herein. Rather, applicants provides these embodiments so that this disclosure will be thorough and complete, and will fully convey the scope of the invention to those skilled in the art. Like numbers refer to like elements throughout.

Referring first to FIG. 1, the fiber optic cable system 20 according to the present invention includes a fiber optic main cable 21 and a fiber optic drop cable 22 connected thereto at a splice closure 24. As would readily be understood by those skilled in the art, the main cable 21 preferably has a relatively high fiber count, such as 48 fibers, while the drop cable 22 is typically a low fiber count cable, such as 2 or 4 fibers. As illustrated, the cable system 20 may be installed so that one or more drop cables extend to desired locations, such as a residence or an ONU, along the route of the main cable 21.

As also illustrated in FIG. 1, the fiber optic cable system 20 may be readily wound onto a conventional cable reel 25 during manufacturing, and delivered and installed in the field from the cable reel, because of the relatively compact outer diameter of the splice closure 24, that is, less than about 1.8 inches. The fiber splice closure 24 is also somewhat flexible and permits the splice closure to bend slightly to conform to the curvature of the cable reel 25.

Although the cable system 20 according to the present may advantageously be assembled in the factory as a preterminated optical fiber cable, those of skill in the art will readily appreciate that the splice closure 24 and techniques described herein may also be readily used for connecting drop cables along a main cable already installed in the field.

Referring now to FIGS. 2 through 5, several components of the splice closure 24 are described. The main cable 21 may be either of the stranded loose buffer tube type, as shown, or the single central buffer tube type, as would be readily understood by those skilled in the art. The stranded loose buffer tube cable includes a plurality of buffer tubes 26 stranded around a plastic coated central supporting member 27. A longitudinally extending portion of the cable sheath 31 and the underlying metallic shield 32 are removed from the main cable 21 to expose the underlying buffer tubes 26. As shown best in FIG. 3, the main cable 21 may also be of the type having an aramid yarn covering 29 surrounding the buffer tubes 26 for strength, and a polyethylene covering 30 positioned between the aramid yarn covering 29 and the metallic shield 32. Fiber guide means 34, as described in greater detail below, is secured adjacent the buffer tubes 26 exposed along the opened portion of the main cable 21. The fiber guide means 34 carries the spliced together fiber portions of the main and drop cables.

A heat shield 37, and heat recoverable housing 38 along with its associated clamp member 39 are positioned to surround the main cable 21 to protect the exposed open sheath portion thereof and the fiber guide means 34. As would be readily understood by those having skill in the art, the heat shield 37, housing 38 and clamp 39 may preferably be of the conventional type as used in copper cable repair and splicing. For example, the heat recoverable material may be a woven sleeve product sold by the assignee of the present invention under the designation XAGA® 550, or an extruded sleeve product sold under the designation XAGA® 500. Strain relief or guide means 40 may be positioned on the opposing ends of the splice closure 24 to facilitate pulling the splice closure through a conduit, as described more fully below.

The heat recoverable housing 38 in the illustrated embodiment preferably includes an interior sealing flap 38a for sealing the upper portion of the housing adjacent the joint between the opposing edges of the housing. A tape wrapping, not shown, may also be used to secure the heat shield 37 in position until the heat recoverable housing is properly positioned around the main cable 21.

A first bonding clamp 41 and a second bonding clamp 42 are secured to respective first and second metallic shield end portions, and a wire 43 is connected between the clamps to maintain the electrical continuity of the metallic cable shield 32. As shown in greater detail in FIGS. 3 through 5, the first clamp 41 includes a shoe 41a and an upstanding threaded stud 41b connected thereto. The shoe 41a is positioned under the metallic cable shield 32 and a top plate 41c is positioned overlying the metallic shield. A suitable crimp connector 43a secured to the end of the wire 43 may also be positioned onto the threaded stud 41b and secured by a suitable locking nut 41d as illustrated.

Figure 17:
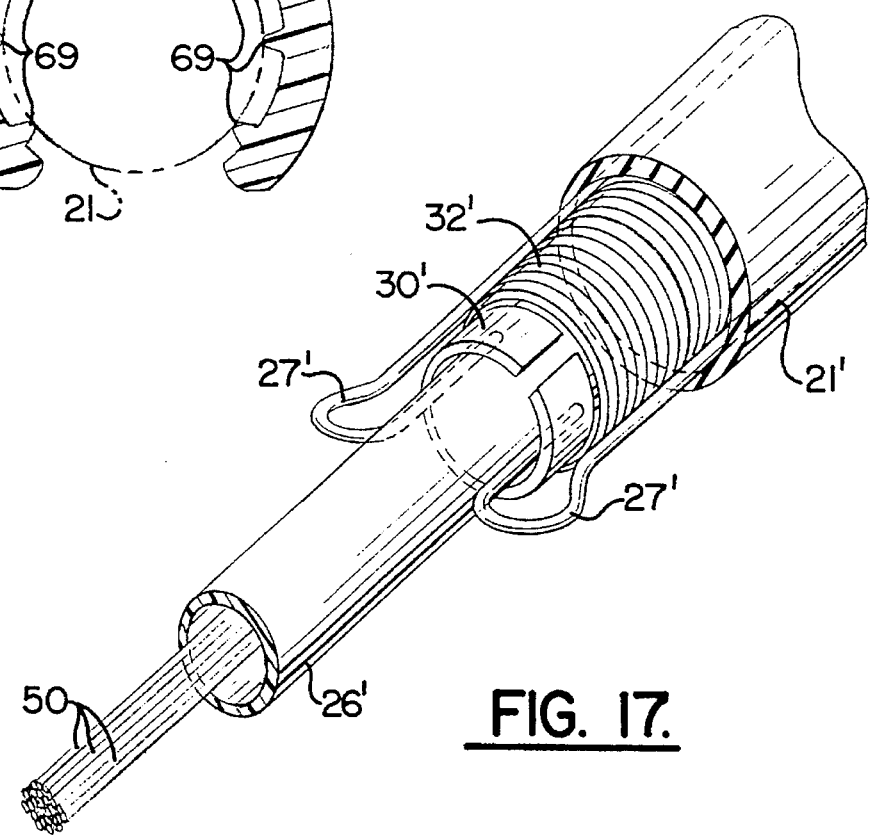
FIG. 17 is a perspective view of a portion of a single buffer tube cable including longitudinal strength members and illustrating how the strength members may be captured according to one aspect of the invention.

Referring now briefly to FIG. 17, a cable 21' having a single central buffer tube 26' is illustrated having a pair of lengthwise extending metallic strength members 27'. These strength members 27' are desirably captured or positioned so that the ends do not move and puncture or damage any adjacent components. In the illustrated embodiment, the ends of the strength members 27' are tucked back into the cable underlying the shield 32' or adjacent coveting 30'. The strength members 27' may be further secured by a tape wrapping, not shown. Alternatively, the strength members 27' may be secured to a bonding clamp of the type described in copending application entitled *FIBER OPTIC BONDING ASSEMBLY AND ASSOCIATED METHOD*, assigned to the assignee of the present invention.

For certain cable types (for example, Siecor EST), the distribution and drop cable strength members are secured by the sleeve, sleeve adhesive, and Tye-Wraps in order to allow field deployment via the recommended procedure of strength member axial pull. The strength members, which are folded back, are protected from shield laceration by a Tye-Wrap. The strength members are folded back across the shield approximately 1 inch. The strength members are initially secured with a Tye-Wrap. Subsequently, the XAGA sleeve is shrunk and adds additional axial pull strength.

Referring briefly again to FIG. 2, the second bonding clamp 42 additionally includes a strap member 44 cooperating therewith to secure the end of the fiber optic drop cable 22 to the main cable 21. Thus, the strap member 44 electrically connects the drop cable metallic shield 23 to the metallic shield 32 of the main cable 21 and, moreover, permits adjustment of the position of the end of the drop cable to ensure proper positioning of spliced together fiber portions as described in greater detail below.

Referring now to FIGS. 2, 3 and 6, and 12–14 another aspect of the present invention is illustrated. Water may enter an unintended penetration in the cable sheath 32 remote from the splice closure 24 and migrate through the cable and into the splice closure. Accordingly, the cable sheath end portions of the main cable 21 are desirably sealed by sealing means to prevent water entry into the splice closure 24 at the respective first and second cable sheath end portions. The sealing means is preferably provided by respective blocking dams 45, 46 formed of a wrapped compressible foam strip, and respective C-shaped bodies 47, 48 of heat flowable material, which when heated flow to fill the voids underlying the heat recoverable housing 38 adjacent the respective blocking dams 45, 46.

As would be readily understood by those skilled in the art, the heat flowable material is preferably a conventional type of heat flowable material, for example, as supplied in small pellet form contained within a mesh pouch in copper cable technology for sealing splices. More particularly, the heat flowable material preferably has a relatively abrupt melt flow point at about 90°–95° C. The C-shaped bodies 47, 48 of the heat flowable material are also positioned to surround the underlying components and thus be adjacent the housing 38 to facilitate the transfer of heat through the housing and to the C-shaped bodies.

For a main cable 21 of the stranded buffer tube design as illustrated, the sealing means also preferably includes concentric C-shaped spacers 48 positioned onto respective buffer tubes 26 (FIG. 3) in an alternating or staggered arrangement as illustrated. The spacers 48 serve to spread the buffer tubes 26 out into spaced apart relation at the cable sheath end portions, to thereby facilitate the flow of the heat flowable material to fully seal the cable sheath end portions.

Figure 13:
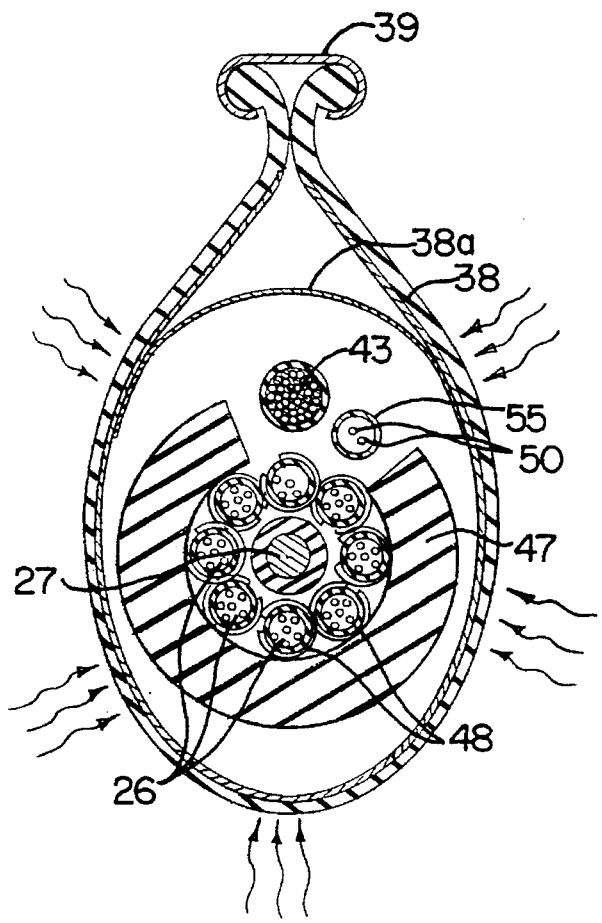
Figure 14:
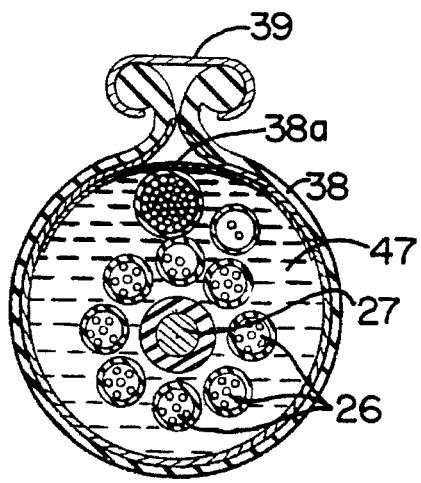

As illustrated best in FIGS. 12 through 14, as heat is applied to cause the heat recoverable tube or housing 38 to shrink down onto the underlying components, the C-shaped body of heat flowable material is also melted and flows to fill the voids adjacent the buffer tubes 26. In one embodiment, the heat recoverable housing 38 may be transparent to permit viewing of the interior of the housing to assure proper flow of material. In addition, a visible bump or protrusion would also indicate that secondary heating may be required to melt the C-shaped bodies.

The concentric spacers 48 further serve to separate the buffer tubes 26 so that the cable sheath end may be completely sealed. As would be readily understood by those skilled in the art, the C-shaped body of heat flowable material 47, blocking dam 45 (FIG. 6) and heat recoverable housing 38 may be used to seal cable sheath end portions of cables for other applications, such as involving conventional in-line or butt splice closures for aerial or buried installation. In addition, this aspect of the invention may be applied to a single central buffer tube cable, and a single spacer may optionally be used to ensure flow to seal the area between the cable shield and the underlying central buffer tube. To facilitate sealing of stranded buffer tube cables, the concentric spacers 48 are also desirably used.

Referring now to FIGS. 7 through 10, the fiber guide means 34 and its installation and functions are explained. As shown in FIG. 8, respective end portions of a pair of predetermined optical fibers 50 are extended outwardly from a first opening 51 in a respective buffer tube 26, by first making a second opening 52 in the same buffer tube 26 at a location downstream from the first location and adjacent a second location whereat the drop cable 22 is secured to the main cable 21. The openings 51, 52 in the buffer tube 26 may be readily made using a conventional procedure as outlined, for example, in Siecor Operator Manual SOM-004- 026 Issue 2 (September 1988) entitled SIECOR™ No-Slack Optical Fiber Access Tool.

The predetermined optical fibers are severed at the second opening 52 and pulled back to extend outwardly from the first opening 51. The spacing between the first and second openings 51, 52 is preferably about a foot to thereby provide sufficient slack for several splice attempts using a conventional fusion splicer, as would be readily understood by those skilled in the art. This relatively short length of fiber may be readily withdrawn from the buffer tube 26 without a substantial likelihood of damaging the fibers.

As would also be readily understood by those skilled in the art, a main cable 21 of the type having a single central buffer tube may also be accessed by cutting a longitudinally extending slit in the buffer tube from a first location to a second location. The optical fibers may be severed at the first location, thereby creating a predetermined length of slack optical fiber for subsequent splicing.

The fiber guide means 34 preferably includes an elongate robe 55 having a longitudinally extending slot 56 therein for receiving therein spliced together fiber portions 50, 57 of the main cable 21 and drop cable 22, respectively. The spliced together fiber portions 50, 57 are positioned within the fiber guide means 34 extending in a substantially longitudinal direction adjacent the main cable 21. Moreover, the length of the elongate tube 55 substantially corresponds to the length of the spliced together fiber portions.

In other words, the spliced together fiber portions 50, 57 are positioned within the elongate tube 55 devoid of a slack coil of optical fiber. Accordingly, the outer diameter of the splice closure 24 may be greatly reduced over prior art designs which required that the closure be sufficiently large to accommodate the minimum bend radius of an optical fiber.

As shown in FIGS. 2 and 11, another feature of the invention is that the drop cable 22 preferably includes a central buffer tube 28 having an end portion positioned within an adjacent end portion of the elongate tube 55 of the fiber guide means 34. The fiber guide means 34 also preferably includes a pair of longitudinally extending arcuately shaped walls 58, 59 connected to the elongate tube 55 and gripping adjacent portions of the buffer tubes 26 of the main cable 21. The elongate tube 55 and arcuately shaped walls 58, 59 may be integrally molded plastic, for example, to reduce the number of component parts.

A foam cushion layer 61 (FIGS. 7 and 9) is preferably provided between the buffer tubes 26 of the main cable 21 and the arcuately shaped walls 58, 59 of the fiber guide means 34. A plurality of longitudinally spaced apart fasteners, such as tie wraps 63, preferably surround the main cable 21, pass through suitable openings in the fiber guide means 34, and surround the pair of arcuately shaped walls 58, 59 to thereby secure the fiber guide means 34 to the main cable. The foam cushion layer 61 resists twist of the guide means 34 independently of the tubes, which might otherwise result in pinched fibers.

As shown best in the exploded view of FIG. 9, the elongate tube 55 includes a slotted opening 64 extending inwardly from a first end thereof. This slotted opening 64 permits the fiber guide means 34 to be positioned over the underlying first opening 51 of the buffer tube 26 to protect the opening and permit routing of fiber end portions 50 into the elongate tube. The fiber guide means 34 also preferably extends longitudinally to cover the second opening 52 in the buffer tube 26 and thereby protect this opening as well. As shown in FIGS. 2 and 7, the wire 43 for maintaining electrical continuity of the metallic shield 32 is preferably positioned in side-by-side relation with the elongate tube 55 of the fiber guide means 34 to thereby further reduce the required exterior diameter of the splice closure 24.

The end portions of the drop cable optical fibers 57 may be spliced together with respective end portions of the predetermined optical fibers 50 of the main cable 21 by conventional means, such as fusion splicing or mechanical splicing as would be readily understood by those skilled in the art. For example, for conventional fusion splicing, protective sleeves 50a, 50b may be secured surrounding the fusion splices (FIG. 10). In addition, the respective lengths of the fibers 50, 57 may be selected to provided the longitudinally staggered relationship of the protective sleeves 50a, 50b as in the illustrated embodiment.

Figure 16:
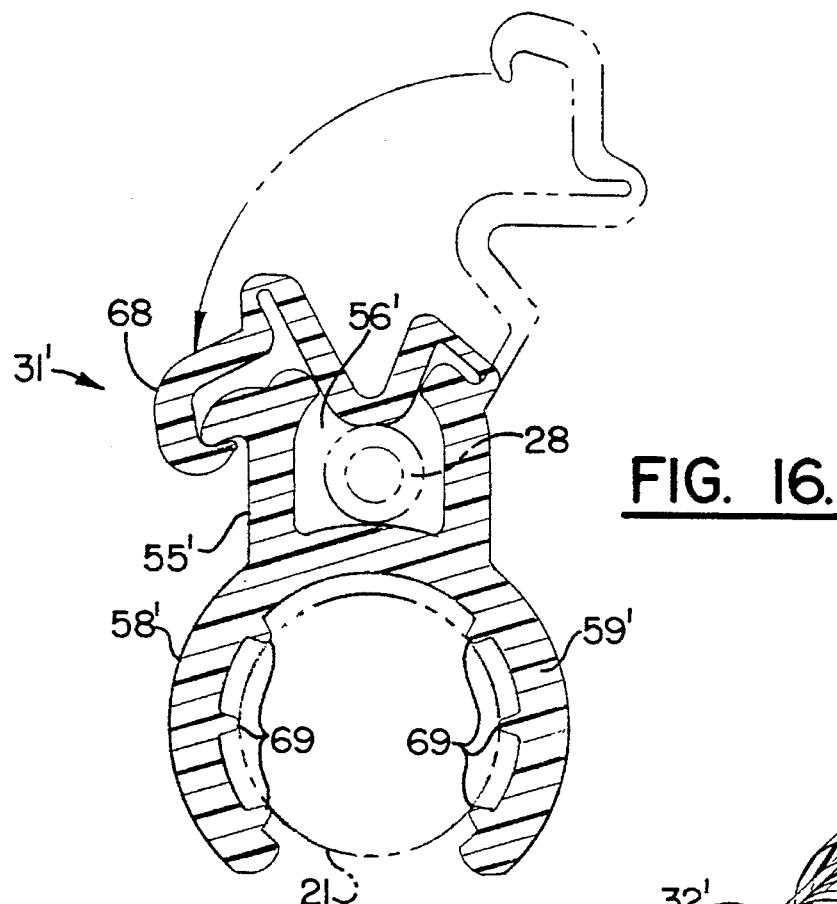
FIG. 16 is an enlarged cross-sectional view of an alternate embodiment of the fiber guide means according to the invention.

Referring now to FIG. 16, another embodiment of fiber guide means 34' according to the invention is illustrated. The fiber guide means 34' includes an elongate tube 55' having an elongate opening 56' and a somewhat square cross-sectional shape, although other configurations are contemplated by the present invention. The embodiment includes a cover 68 integrally molded with the elongate tube 55' and the depending sidewalls 58', 59'. The interior of the sidewalls 58', 59' also include longitudinal ribs 69 for gripping adjacent portions of the main cable 21. The interior of the elongate tube 55' may be filled with a gel, not shown, to prevent movement of the spliced together fiber portions 50 therein.

Figure 18:
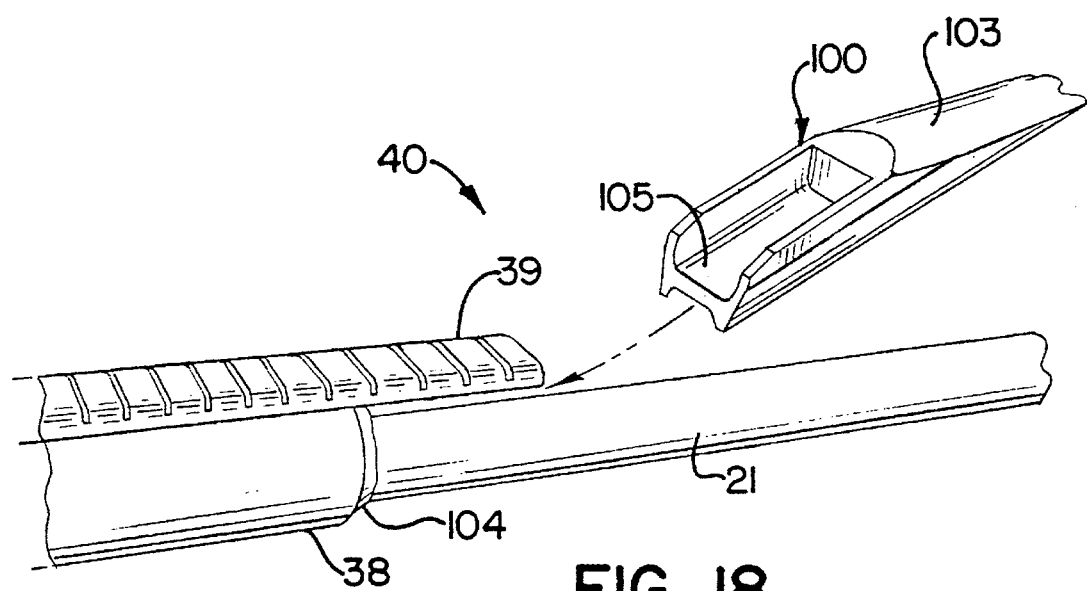
FIGS. 18–20 are perspective views of an end portion of the housing according to the invention illustrating a first embodiment of a strain relief or cable guide means being secured to an end of the splice closure housing.
Figure 19:
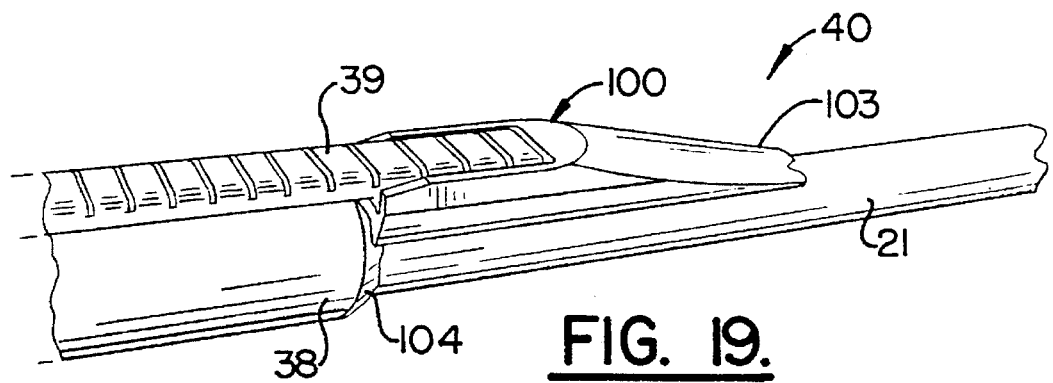
Figure 20:
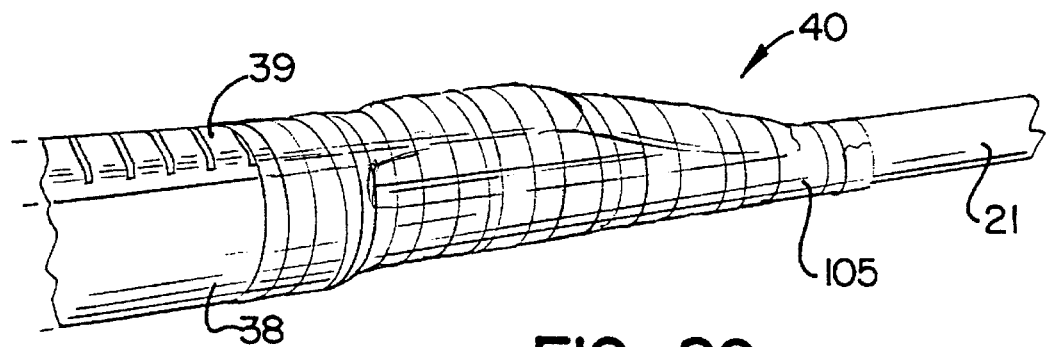

Referring now to FIGS. 18–20 a first embodiment of a strain relief or guide means 40 in combination with a heat recoverable housing 38 and cable 21 according to another aspect of the present invention are illustrated being assembled. The strain relief or guide means 40 is preferably positioned on each end of the splice closure housing 38

(FIG. 1) to provide both strain relief and to assist in guiding the closure through a conduit, for example. While the strain relief or guide means 40 may preferably be used in combination with the splice closure 24 for the main cable 21 and drop cable 22 as shown in FIG. 1, those of skill in the art will readily understand that the strain relief or guide means may be used in other splicing arrangements as well, such as in conventional copper cable splices.

More particularly, the cable 21 has a first degree of flexibility, while the heat recoverable housing 38 surrounding the cable splice will have a second degree of flexibility higher than the first degree of flexibility of the cable. The housing 38 also includes an end opening through which a portion of the cable emerges. As shown in the illustrated embodiment, a portion of heat flowable material 104 is shown adjacent the end opening of the housing 38.

The strain relief or guide means 40 is secured to the emerging portion of the cable 21 immediately downstream from the end opening of the housing 38 to provide strain relief to the emerging cable portion. The strain relief or guide means 40 includes an elongate body 100 and means for securing the elongate body to the emerging cable portion. The elongate body 100 preferably has a predetermined degree of flexibility, for producing in combination with the emerging cable portion, a third degree of flexibility between the first and second degrees of flexibility to thereby provide strain relief to the emerging cable portion.

The housing 38 is preferably provided by a sheet of heat recoverable material having a pair of abutting longitudinally extending edge portions 38b (FIG. 1), and a clamp member 39 for securing the edge portions together thereby defining an enlarged circumferential portion for the housing. Accordingly, the elongate body 100 preferably further includes a longitudinally extending tapered portion 103 aligned with the enlarged circumferential portion for facilitating passage of said splice closure through a conduit.

In the illustrated embodiment of the invention, the clamp member 39 has an end portion extending longitudinally outwardly a predetermined distance beyond adjacent edge portions 38b of the sheet of heat recoverable material. Accordingly, a portion of the elongate body 100 adjacent the tapered portion 103 has a recess 105 therein receiving therein the end portion of the clamp member 39. A tape wrapping 105 is preferably used to secure the elongate body 100 to the cable 21 and the clamp member 39. The extending end of the clamp member 39 serves to maintain the elongate body 100 in proper rotational alignment with the enlarged circumferential portion of the housing 38.

Figure 21:
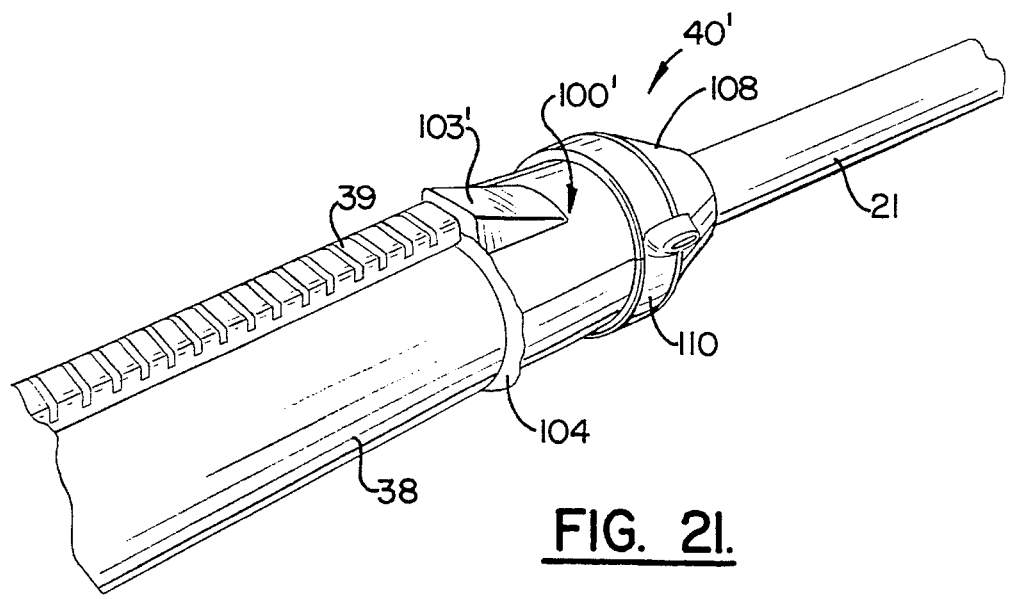
FIGS. 21 and 22 are perspective views of an end portion of the housing according to the invention illustrating a second embodiment of a strain relief or cable guide means secured to an end of the splice closure housing.
Figure 22:
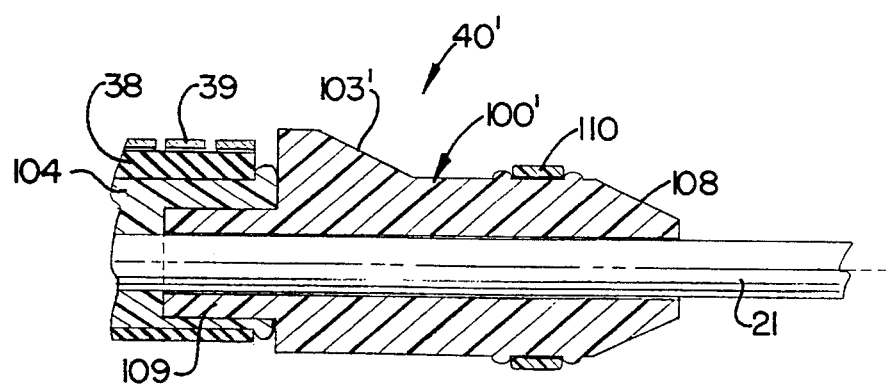

A second embodiment of the strain relief or guide means 40' is shown in FIGS. 21 and 22. Like elements are indicated by prime notation and thus need not be described further. In the illustrated embodiment, the elongate body 100' surrounds the cable 21 and thus is preferably formed of mating halves to facilitate installation. In addition, the elongate body 100' preferably includes a second or tapered distal end portion 108 immediately adjacent the cable 21 for further facilitating passage of the splice closure through a conduit. The elongate body 108 also preferably includes a proximal end portion 109 (FIG. 22) extending longitudinally into the end opening of the heat recoverable housing 38 and between the cable 21 and the housing, thus, providing even greater strain relief capability. A fastener, such as a tie wrap 110 may be used to secure halves of the elongate body 100' to the cable 21.

Figure 15:
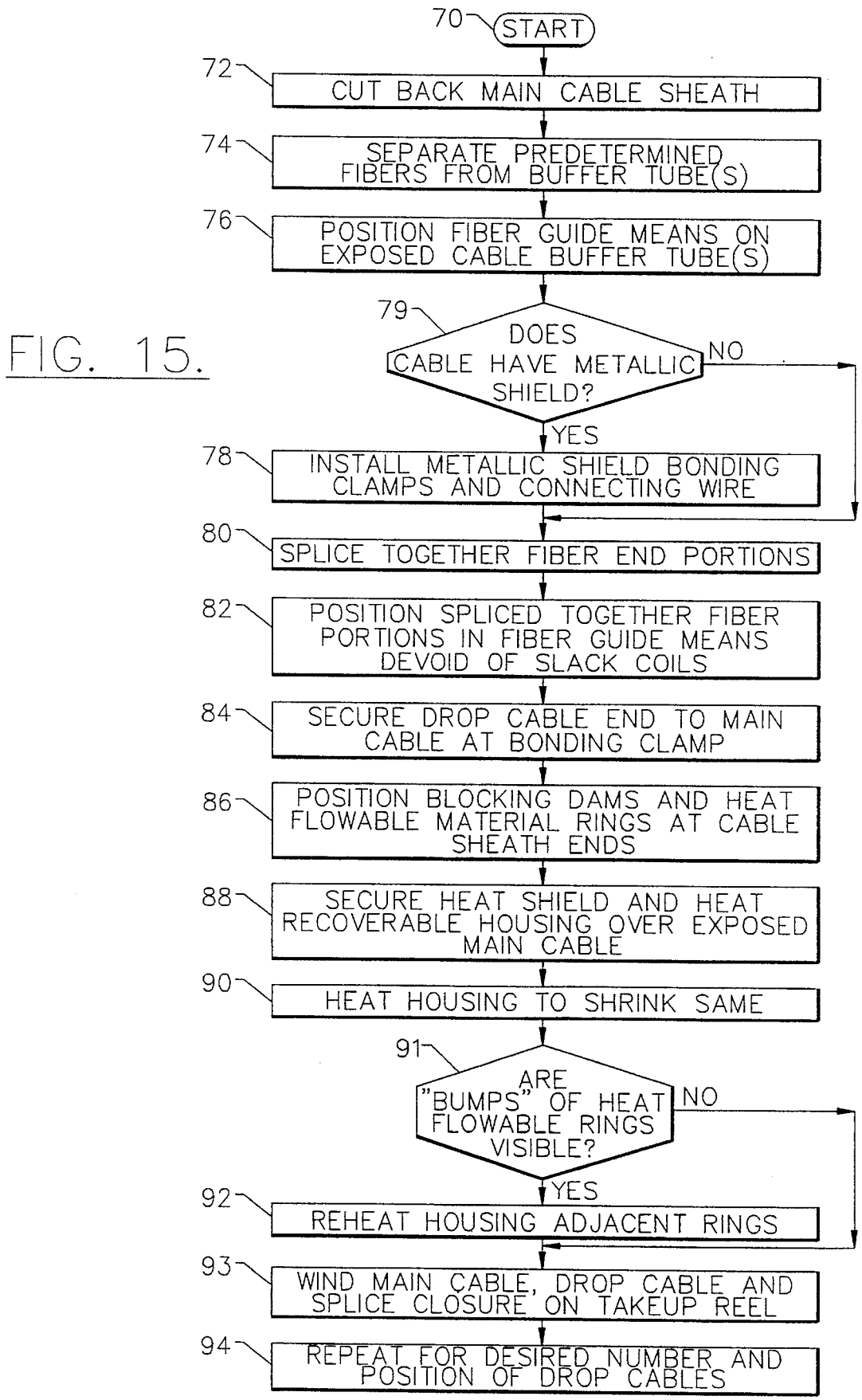
FIG. 15 is a flowchart block diagram of a method of fabricating the fiber optic cable system of the present invention.

Referring now to additionally to the flowchart of FIG. 15, method steps according to the present invention are described. If a preterminated fiber optic system is being made, the following steps explained would desirably be performed in a factory environment; however, the steps may also be performed in the field, for example, to add a drop cable 22 to an existing main cable 21. Upon starting (Block 70), a technician cuts back the cable sheath 31 of the main cable 21 at Block 72. Other cable components may also be removed, such as an aramid yarn layer 29 and surrounding covering 30. The predetermined fiber end portions 50 from the main cable 21 are then separated from other fibers and extended outwardly from the respective buffer tube 26 (Block 74).

The fiber guide means 34 extensively described above is then positioned on the exposed portion of the buffer tubes of the main cable 21 (Block 76). At Block 79, if the cable has a metallic shield 32, at Block 78 the bonding clamps 41, 42 and the interconnecting wire 43 are installed onto the respective metallic shield end portions to maintain the electrical continuity of the shield 32.

The respective end portions of the optical fibers of the main and drop cables are spliced together at Block 80 and positioned through the longitudinal opening 56 of the elongate tube 55 so that the spliced together fiber portions 50, 57 are secured within the elongate tube 55 and are devoid of slack coils of optical fiber to thereby provide a compact splice closure 24 (Block 82).

The end of the drop cable 22, and more particularly, the exposed portion of the metallic shield 23 may be positioned within the strap 44 of the second bonding clamp 42 and its position adjusted to maintain a desired nontaut condition in the spliced together fiber portions 50, 57 (Block 84). A cover 68 (FIG. 16) may be positioned over the elongate tube 55' to cover its longitudinal opening 56'.

At Block 86, the blocking dams 45, 46 are positioned adjacent the ends of the fiber guide means 34, and the respective C-shaped heat flowable material bodies or rings 47, 48 are positioned surrounding the buffer tubes 26 (Block 88). The concentric spacers 48 may also be positioned around the buffer tubes 26 to spread the buffer tubes into spaced apart relation.

At Block 90, the heat shield 37 and heat recoverable housing 38 are positioned surrounding the main cable 21 and underlying fiber guide means 34. Accordingly, at Block 90 the housing 38 is heated to its heat recovery temperature, such as using a conventional oven or torch as used for similar heat recoverable housings for copper cables. During heating of the housing 38, the C-shaped bodies 45, 46 of heat flowable material may melt and flow to completely seal the cable sheath end portions. At Block 91 if heat flowable material bodies have not been sufficiently heated to melt and flow, bumps in the housing may be visible, and if so, a secondary heating step (Block 92) will melt the bodies and cause the material to flow and fill the voids at the cable sheath end.

For a single field-installed drop cable and its associated splice closure, the splice closure and drop cable may then be installed into their desired positions. For a preterminated fiber optic system, at Block 92 the splice closure 24 and the respective portions of the main cable 21 and the drop cable 22 may be wound onto a takeup reel 25 and the process repeated for a desired number and position of a series of drop cables (Block 94). The preterminated cable may then be shipped and placed along its desired route in the field.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A fiber optic cable splice closure of the type for joining a fiber optic main cable to a fiber optic drop cable, the fiber optic main cable comprising a buffer tube having an opening at a first location, and at least one optical fiber having an end portion extending through the opening at the first location, the fiber optic drop cable having an end secured to the main cable at a second location downstream from the first location, the fiber optic drop cable comprising at least one optical fiber having an end portion extending outwardly from the end of said drop cable, the end portion of the at least one optical fiber of the drop cable being spliced together with an end portion of the at least one optical fiber of said main cable thereby defining at least one spliced together fiber portion, said splice closure comprising:

fiber guide means adapted for extending adjacent the main cable between the first and second locations and for guiding the at least one spliced together fiber portion adjacent the main cable in a generally longitudinal direction devoid of a slack coil of optical fiber, said fiber guide means comprising:

an elongate tube having a logitudinally extending slot therein adapted for receiving therein the spliced together fiber potions, and tube securing means adapted for securing said elongate tube to the main cable; and a housing surrounding the main cable and said fiber guide means.

2. A fiber optic splice closure according to claim 1 wherein said tube securing means comprises a pair of longitudinally extending arcuately shaped walls connected to said elongate tube and adapted for gripping adjacent portions of said main cable.

3. A fiber optic splice closure according to claim 2 wherein said fiber guide means further comprises a foam cushion layer adapted for underlying said arcuately shaped walls of said tube securing means.

4. A fiber optic splice closure according to claim 1 wherein the fiber optic main cable is of the type further comprising a metallic shield surrounding the one or more buffer tubes; wherein a longitudinally extending portion of the metallic shield is removed from the main cable and defines first and second metallic shield end portions adjacent respective first and second locations along the main cable; and further comprising electrical connection means adapted for electrically connecting the first and second metallic shield end portions together to maintain continuity of the metallic shield.

5. A fiber optic splice closure according to claim 4 wherein said electrical connection means comprises a predetermined length of wire, and first and second bonding clamps adapted for securing opposing ends of the wire to respective first and second metallic shield end portions.

6. A fiber optic splice closure according to claim 5 wherein said second bonding clamp includes strap means adapted for securing the fiber optic drop cable to the main cable at the second location.

7. A fiber optic cable system according to claim 6 wherein the drop cable is of the type including a metallic shield, and wherein said strap means is adapted to surround an end portion of the shield of the drop cable for electrically connecting thereto.

8. A fiber optic cable splice closure of the type for joining a fiber optic main cable to a fiber optic drop cable, the fiber optic main cable comprising an outer sheath surrounding the one or more buffer tubes, wherein a longitudinally extending portion of the sheath is removed from the main cable and defines first and second cable sheath end portions adjacent respective first and second locations along the main cable, at least one such buffer tube having an opening at a first location, and at least one optical fiber having an end portion extending through the opening at the first location, the fiber optic drop cable having an end secured to the main cable at a second location downstream from the first location, the fiber optic drop cable comprising at least one optical fiber having an end portion extending outwardly from the end of said drop cable, the end portion of the at least one optical fiber of the drop cable being spliced together with an end portion of the at least one optical fiber of said main cable thereby defining at least one spliced together fiber portion, said splice closure comprising:

fiber guide means adapted for extending adjacent the main cable between the first and second locations and for guiding the at least one spliced together fiber portion adjacent the main cable in a generally longitudinal direction devoid of a slack coil of optical fiber; and a housing surrounding the main cable and said fiber guide means, said housing including a heat recoverable material and a heat shield layer underlying said heat recoverable material for protecting said fiber guide means when heating said housing.

9. A fiber optic splice closure according to claim 8 wherein said splice closure further comprises sealing means contained within said heat recoverable housing adjacent opposing first and second ends thereof and adapted for sealing adjacent cable sheath end portions of the main cable, and wherein said sealing means comprises first and second masses of heat flowable material adjacent respective first and second cable sheath end portions.

10. A fiber optic splice closure according to claim 9 wherein each of said sealing means further comprises first and second blocking dams adjacent respective first and second ends of said fiber guide means for preventing flow of said heat flowable material into said guide means, and wherein each of said blocking dams comprises a compressible material.

11. A fiber optic splice closure according to claim 9 wherein said main cable is of the type including a plurality of buffer tubes, and wherein said sealing means further comprises first and second pluralities of concentric spacers adapted for surrounding predetermined ones of said plurality of buffer tubes adjacent respective first and second cable sheath end portions for maintaining said buffer tubes in spaced apart relation to facilitate flow of said heat flowable material into voids between said spaced apart buffer tubes.

* * * * *